United States Patent
Brandt

(10) Patent No.: US 7,643,702 B1
(45) Date of Patent: Jan. 5, 2010

(54) OBJECT DETECTION IN IMAGES USING A GRAPHICS PROCESSOR

(75) Inventor: Jonathan Brandt, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 809 days.

(21) Appl. No.: 10/898,489

(22) Filed: Jul. 23, 2004

(51) Int. Cl.
*G06K 9/36* (2006.01)
*G06K 9/66* (2006.01)
*G06K 9/62* (2006.01)

(52) U.S. Cl. .................. 382/289; 382/190; 382/216

(58) Field of Classification Search .............. 382/278, 382/287, 291, 298, 159, 216, 293, 289; 356/138; 702/150; 345/689
See application file for complete search history.

(56) References Cited

U.S. PATENT DOCUMENTS

| | | | |
|---|---|---|---|
| 5,715,385 A * | 2/1998 | Stearns et al. | 345/648 |
| 6,021,222 A * | 2/2000 | Yamagata | 382/199 |
| 6,567,564 B1 * | 5/2003 | van der Wal | 382/260 |
| 6,738,518 B1 * | 5/2004 | Minka et al. | 382/218 |
| 6,993,156 B1 * | 1/2006 | Szeliski et al. | 382/103 |
| 7,215,816 B2 * | 5/2007 | Ikushima | 382/227 |
| 7,215,830 B2 * | 5/2007 | Knee et al. | 382/293 |
| 7,256,791 B2 * | 8/2007 | Sullivan et al. | 345/545 |
| 7,274,832 B2 * | 9/2007 | Nicponski | 382/297 |
| 2002/0138853 A1 * | 9/2002 | Chuuma et al. | 725/141 |
| 2003/0133613 A1 * | 7/2003 | Ono | 382/209 |
| 2004/0085310 A1 * | 5/2004 | Snuffer | 345/419 |
| 2005/0105805 A1 * | 5/2005 | Nicponski | 382/216 |

FOREIGN PATENT DOCUMENTS

WO   WO2006/041426   4/2006

OTHER PUBLICATIONS

Rowley et al, "Neural Network-Based Face Detection," IEEE Transactions on Pattern Analysis and Machine Intelligence, Jan. 1998; vol. 20, No. 1, pp. 23-38.*
Rowley et al., "Rotation Invariant Neural Network-Based Face Detection", Dec. 1997.*
Rowley et al., "Neural Network-Based Face Detection", Jan. 1998.*

* cited by examiner

*Primary Examiner*—Wenpeng Chen
*Assistant Examiner*—Soo Jin Park
(74) *Attorney, Agent, or Firm*—Fish & Richardson P.C.

(57) ABSTRACT

Methods, systems and apparatus, including computer program products, for processing electronic images. An electronic image is transformed to generate a transformed image according to a first coordinate transformation. The transformed image is filtered, and a second coordinate transformation is applied to the filtered image to align the filtered image with an accumulation array that includes multiple accumulation elements. Each accumulation element is updated based on a respective value in the aligned image. The operations of generating a transformed image according to a first transformation, filtering the transformed image, applying a second transformation and updating each accumulation element are iterated for one or more further first coordinate transformations. These techniques can be implemented to detect features in the image using a graphics processing unit.

59 Claims, 6 Drawing Sheets

OBJECT DETECTION IN IMAGES USING A GRAPHICS PROCESSOR

BACKGROUND

The present invention relates to digital image processing.

A digital image is a collection of discrete numerical values that define a visual appearance. The digital image can be represented by an array of pixels that are basic picture elements. Each pixel represents a local portion of the image and alone or together with other pixels determines local attributes, such as color, gray level, luminosity, transparency or other graphical attribute of the image portion. Alternatively, the digital image can be represented by object-oriented graphics that specifies one or more vector graphics objects for the image. Each vector graphics object is a one or more dimensional geometrical object, such as a line, a polygon, an arc, a circle, a cube or a sphere, defined by mathematical formulas. The vector object can have attributes, such as color, location, scale, mask, texture, line width or line pattern. For example, the texture specifies variations of one or more graphical attributes within a surface portion defined by the vector object. Textures can be used to illustrate three-dimensional effects in two dimensions. For displaying or other image processing operations, the vector objects can be rendered and rasterized onto a pixel array. The object-oriented graphics can also specify compositing rules on how to rasterize multiple vector objects of the image onto a pixel array.

Digital images are generated or processed by graphical software applications, such as presentation, animation, painting or design applications that are typically executed in a computer system including a central processing unit ("CPU"), and often, a separate graphics processing unit ("GPU", also called a graphics processor) that is dedicated to process and display digital images. The GPU is designed to receive digital images, rasterize vector graphics objects, and perform coordinate transformations on images in a highly parallelized way. The GPU can be programmed based on an application program interface ("API") that specifies a set of basic operations for building a graphics application that uses the GPU. The basic operations typically include polygon rendering operations and image data reading and writing operations. The GPU receives instructions and image data through an interface that is connected with other components of the computer system, such as the system's CPU, main memory or input/output ("I/O") unit. The graphics processing unit is typically also configured to drive a display device or process image data received from an image capturing device.

Object detection is a process of determining whether an image contains instances of a particular object, such as a face. Typically, the image specifies a graphical representation of the particular object at an unknown location with an unknown variation in appearance. For example, the face can appear in the image at any location and its appearance can depend on lighting and viewing conditions, such as a viewing angle or a viewing distance. Thus, the face can appear in the image with any size and orientation within a broad range of sizes and orientations. To consider all such variations, object detection typically requires a large amount of data processing.

SUMMARY

Features are detected in a digital image using techniques that can be performed by a graphics processing unit. For example, the graphics processing unit can be used to detect an object in a digital image. Alternatively, the feature detection techniques can be performed by any data processing device.

In general, in one aspect, the invention provides methods and apparatus, including computer program products, for processing electronic images. An electronic image including a plurality of input pixels is received. A transformed image corresponding to a first coordinate transformation of the received image is generated. The transformed image is filtered to generate a filtered image. A second coordinate transformation is applied to the filtered image to align the filtered image with an accumulation array that includes a plurality of accumulation elements. The aligned image specifies a respective value for each accumulation element that is updated based on the respective value in the aligned image. The operations of generating a transformed image according to a first transformation, filtering the transformed image, applying a second transformation, and updating each accumulation element are iterated for one or more further first coordinate transformations.

Particular implementations can include one or more of the following features. Filtering the transformed image can include determining a filtered value based on image data within a source window in the transformed image, and assigning the filtered value to a corresponding location in the filtered image. Determining the filtered value can include calculating an output of a neural network whose input is defined based on the image data within the source window. Determining the filtered value can include determining a confidence value that is a figure of merit on whether a particular object is illustrated in the source window. The accumulation array can be used to identify at least one location in the received image as a location where the particular object is illustrated in the image. Updating each accumulation element based on the respective value in the aligned image can include assigning the respective value in the aligned image to the accumulation element if the respective value in the aligned image is larger than an accumulated value specified by the accumulation element before the update. Updating each accumulation element can include associating the transformation parameters with the accumulation element if the respective value in the aligned image is larger than the accumulated value before the update. Associating the transformation parameters with the accumulation element can include storing one or more of the transformation parameters as a red, green, blue or transparency component of a pixel corresponding to the accumulation element in a pixel array. The accumulation array can include a respective accumulation element for each input pixel. Generating a transformed image can include generating a transformed image corresponding to a rotation, a zooming in or a zooming out transformation of the received image. The first coordinate transformation can be specified by two or more elementary transformations, and the second coordinate transformation can be an inverse of one or more of the elementary transformations. The second coordinate transformation can be an inverse of the first coordinate transformation. Generating the transformed image that corresponds to the first coordinate transformation of the received image can include applying the first coordinate transformation to the received image. Filtering the transformed image can include instructing a graphics processing unit to perform one or more basic operations of the graphics processing unit, where the basic operations include basic polygon rendering operations. Each basic polygon rendering operation can include receiving a vector graphics object and rasterizing the vector graphics object onto a pixel array. Updating each accumulation element can include assigning a first buffer and a second buffer to the accumulation element, using the first buffer to specify an accumulated value before the update, and using the second buffer to store an updated accumulated value. For each accumulation element in a subsequent iteration, the second buffer can be used to specify the accumulated value before the update and the first buffer can be used to store the updated accumulated value.

In general, in another aspect, the invention provides a system for detecting features in an electronic image including a plurality of input pixels. The system includes a central processing unit, and a graphics processing unit that is controlled by the central processing unit and configured to receive the image and detect a feature in the received image. The graphics processing unit implements a first coordinate transformer to generate a transformed image that corresponds to a first coordinate transformation of the received image, a detection filter to filter the transformed image to generate a filtered image, a second coordinate transformer to apply a second coordinate transformation to the filtered image, where the second coordinate transformation aligns the filtered image with an accumulation array that includes a plurality of accumulation elements, and the aligned image specifies a respective value for each accumulation element. The graphics processing unit also implements an accumulator to update each accumulation element based on the respective value in the aligned image.

Particular implementations can include one or more of the following features. The central processing unit can be configured to instruct the graphics processing unit to iterate, for one or more further first coordinate transformations, operations that include generating a respective transformed image using the first coordinate transformer, filtering the transformed image using the detection filter, aligning the filtered image with the accumulation array using the second coordinate transformer, and based on the aligned image, updating the accumulation array using the accumulator. The first and second coordinate transformers can include programmable hardware of the graphics processing unit to perform the first and second coordinate transformations, respectively. The central processing unit can be configured to preprocess the image.

The invention can be implemented to realize one or more of the following advantages. By using a graphics processing unit of a computer system, objects or other features can be detected in an image in a quick and efficient way. High quality object detection applications can be built using basic operations that are performed in a highly parallelized way by the GPU. The GPU can include hardware built for coordinate transformations, bilinear or bicubic interpolation, or MIP-map filtering, and the built-in operations can be performed without incurring additional computational cost. Thus objects can be detected in the image within a short time, such as without perceivable delays. Objects can be efficiently detected even in large scale images. To detect a particular object, the system can scan a large number of potential variations of the particular object both in size and orientation within a relatively short time. The objects can be detected in the image without excessively using computational resources that are primarily designated to other operations. Thus while the GPU processes data to detect objects in the image, a CPU of the computer system can perform other operations. The GPU can receive the image, for example, from an image capturing device, and detect features in it without transferring the image to the CPU. The feature detection can also be implemented as part of an image processing operation, such as image rendering, that is performed by the GPU. Thus the system can avoid data transfer overhead of moving the image data to the CPU just to do object detection.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
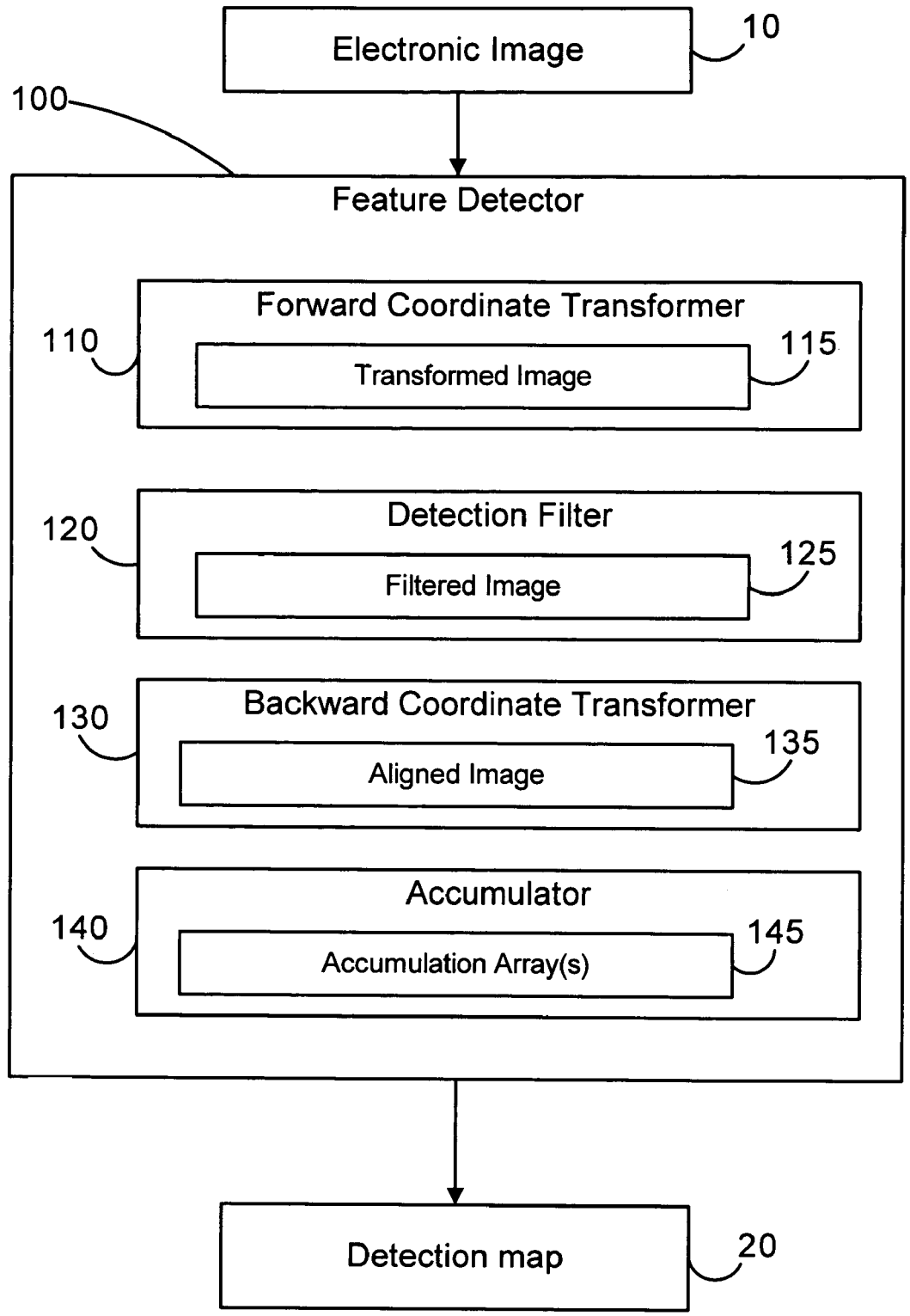
FIG. 1 is a schematic diagram illustrating a feature detector.

FIG. 1 is illustrating a feature detector 100 that can be used to detect one or more features in a digital image 10. In one implementation, the feature detector 100 is used to detect a particular object in the image 10. The feature detector 100 can be implemented in a software application or as a plug-in to a software application. The software application can be executed using a graphics processing unit or any other data processing apparatus, such as a central processing unit of a computer system. Alternatively, the feature detector 100 can be implemented in hardware or in a combination of software and hardware. For example, the feature detector 100 can be implemented in an image capturing device.

The feature detector 100 processes image data specified by the digital image 10, and generates a detection map 20 based on the processed image data. The digital image 10 may represent instances of a particular feature, and the detection map 20 defines confidence values for locations in the digital image 10, where each confidence value is a figure of merit on whether the image 10 represents the particular feature at a corresponding location. For example, each confidence value can define an estimated probability that the image 10 contains the particular feature at the corresponding location.

The digital image 10 is specified by a pixel array in which each pixel defines one or more local attributes of the image 10. In one implementation, each pixel has three color components, such as red, green and blue ("RGB") components. Alternatively, the pixels can specify different, less or more components. For example, the color components can be those in a luminance-chrominance type color space, or each pixel can specify only a single gray component. In addition to color components, each pixel can also have a transparency component. In one implementation, the digital image 10 has gone through a preprocessing to optimize the image data for feature detection. The preprocessing can adjust color, luminance, alignment, contrast, sharpness or any other attribute of the image. For example, all colors can be converted into corresponding gray levels.

The feature detector 100 includes a forward coordinate transformer 110, a detection filter 120, a backward coordinate transformer 130 and an accumulator 140. From the received digital image 10, the forward coordinate transformer 110 generates a transformed image 115 according to a current "forward" coordinate transformation. The current forward coordinate transformation specifies a variation, such as a rotation or a zooming in or out transformation of the received image 10, without implying any particular way or direction in implementing the transformation. The detection filter 120 is defined based on a feature to be detected, and filters the transformed image 115 to generate a filtered image 125 that characterizes correlations between the transformed image 115 and the feature to be detected. The backward coordinate transformer 130 applies a "backward" coordinate transformation. The backward coordinate transformation aligns the filtered image 125 with an accumulation array 145, and may or may not include a component that is inverse to a corresponding component of the current forward coordinate transformation. Thus an aligned image 135 is generated that is used by the accumulator 140 to update the accumulation array 145.

The feature detector 100 iterates, that is, repeats, the steps of forward coordinate transformation, detection filtering, backward coordinate transformation and accumulation for a number of different forward coordinate transformations that correspond to different variations of the feature to be detected. Thus the feature detector 100 scans different variations of the image 10, and accumulates the corresponding results in the accumulation array 145. After scanning all required variations, the feature detector 100 specifies the detection map 20 based on the results accumulated in the accumulation array 145.

The forward coordinate transformer 110 generates the transformed image 115 by applying one or more coordinate transformations. The coordinate transformations can be applied to the digital image 10 directly or indirectly, for example, by transforming a previously transformed image that has been generated in an earlier iteration. Either way, the applied coordinate transformations are defined to generate the transformed image 115 such that it corresponds to a current forward coordinate transformation of the received image 10. The current forward coordinate transformation can include a rotation, a zooming in or out, a stretching or shrinking in a particular spatial direction, a projection or any affine or homographic transformation. In addition to coordinate transformations, the feature detector can apply other transformations, such as blurring, sharpening, or adjusting luminance or contrast. Thus the applied transformations define the transformed image 115 to represent a current variation of the received digital image 10.

The detection filter 120 is defined based on a canonical form of the feature to be detected. The canonical form can correspond to a canonical orientation, a canonical size or other canonical attribute of the feature to be detected. The detection filter 120 can also be defined based on a "training set" that includes positive examples representing variations of the feature to be detected. While the canonical attributes are kept constant, the positive examples include variations of other attributes of the feature. In addition to positive examples, the training set can also include negative examples that do not include the feature to be detected. The detection filter 120 is defined such that when it is applied to the transformed image 115, the filtered image 125 will characterize correlations between the feature to be detected and a current variation of the received image 10 as represented by the transformed image.

The detection filter 120 determines a filtered value for each pixel in the filtered image 125 based on image data in a predetermined neighborhood of the pixel in the transformed image 115. The predefined neighborhood is also referred to as a "source window" or a "scanning window". The detection filter 120 can include any type of filter, such as a linear convolution filter that determines a filtered value for each pixel in the filtered image 125 by calculating a weighted sum of all the pixel values within the source window in the transformed image 115. Or the detection filter 120 can include non-linear filters that use a non-linear function of the pixel values within the source window. The detection filter 120 can also include a set of primary filters that directly filter the image data within the source window, and one or more secondary filters that filter the output of the primary filters or that of other secondary filters. For example, the detection filter 120 can include one or more property calculators and a classifier. Each property calculator corresponds to a respective property, and determines a value for that property based on image data within the source window. The classifier receives the determined property values as input and determines the final filtered value as output. For object detection, the property calculators or the classifier can be defined based on training a neural network as discussed in more detail below with reference to FIG. 7. The object detection can also be based on thresholding or an AdaBoost algorithm.

The backward coordinate transformer 130 applies a backward coordinate transformation that transforms the filtered image 125 into the image 135, which is aligned with the accumulation array 145. The accumulation array 145 defines a specific orientation, size or other geometrical attribute for the aligned image 135, and the backward coordinate transformation is defined to transform the filtered image 125 to have that specific orientation size or other geometrical attribute. For the accumulation array 145, the specific image orientation or size can be the same as that of the received image 10. Alternatively, the orientation or the size can be different.

The accumulator 140 updates the accumulation array 145 that includes multiple accumulation elements. The accumulation elements can be initialized to a predetermined value, such as zero. Each accumulation element is updated based on one or more corresponding pixels in the aligned image 135. In one implementation, each pixel in the aligned image 135 corresponds to a respective accumulation element in the accumulation array 145, and each accumulation element is updated based on the corresponding pixel. Alternatively, each accumulation element can be updated based on multiple pixels in the aligned image 135.

In the accumulation array 145, each accumulation element specifies one or more accumulated values. For each accumulated value, the update is based on the corresponding pixel values in the aligned image 135. For example, the updated accumulated value can be determined by calculating the sum, the maximum or any other function of the corresponding pixel value and a previous accumulated value specified by the accumulation element before the update. If the update determines the maximum of the previous accumulated value and the corresponding pixel value, the maximum value can be associated with a forward transformation of the transformed image that provided the maximum. For example, the transformed image's orientation and zoom level can be associated with the maximum value.

Figure 2:
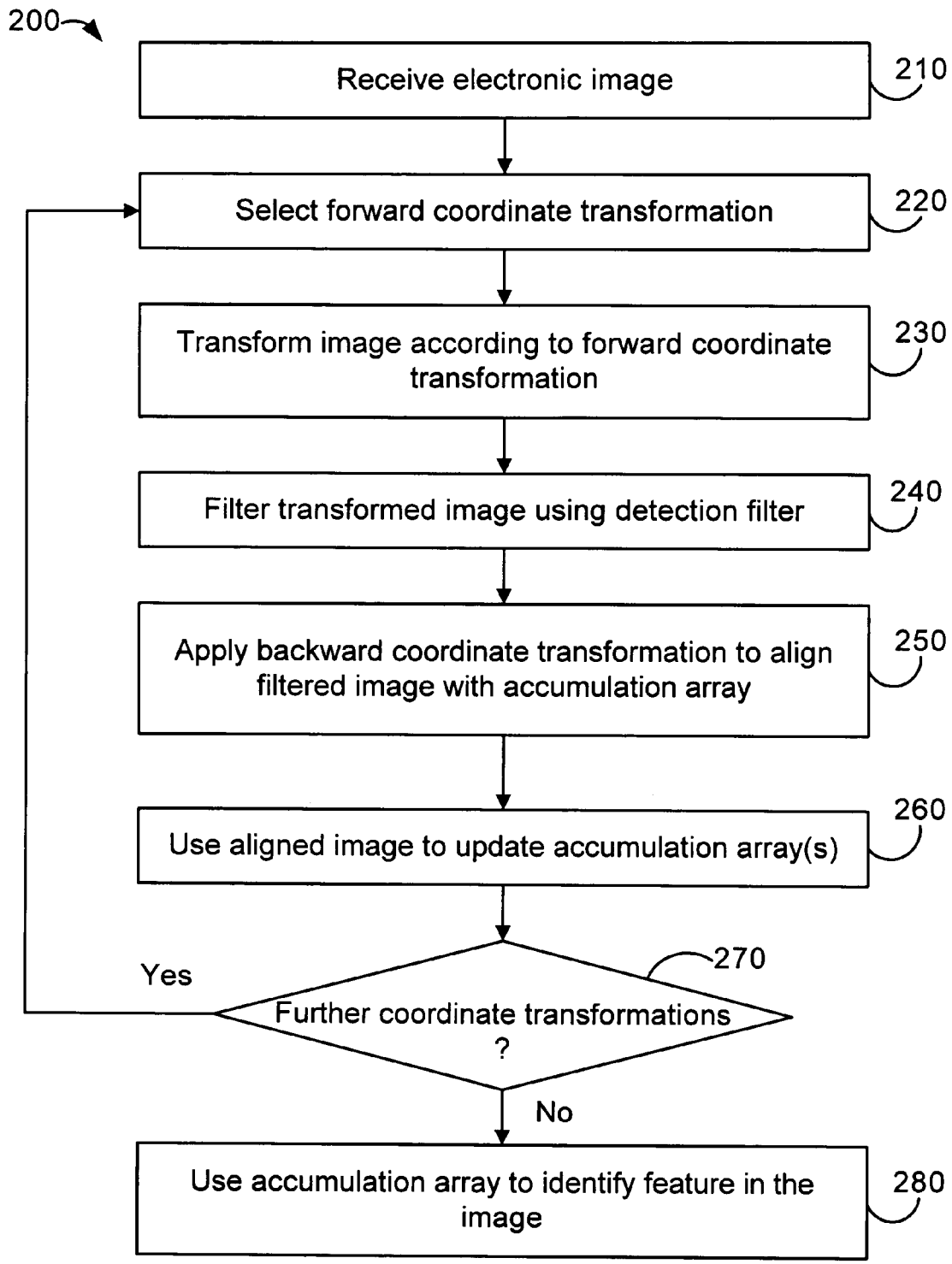
FIG. 2 is a schematic flow diagram illustrating a method for identifying features in digital images.

FIG. 2 illustrates a method 200 for feature detection. The method 200 can be performed by a system that includes the feature detector 100 (FIG. 1). In one implementation, the system includes a CPU and a separate GPU, and one or more steps of the method 200 are executed by the GPU.

The system receives a digital image including multiple pixels (step 210). Optionally, the system can preprocess the received image. During the preprocessing, the system can convert colors to gray levels, adjust luminance, contrast or resolution.

The system selects a current forward coordinate transformation (step 220), and transforms the received image according to the selected transformation (step 230). The forward coordinate transformation can include multiple elementary coordinate transformations, such as a rotation and a zooming out operation. The system can select the forward coordinate transformation randomly or from a set of predetermined elementary transformations. The predetermined set can specify discrete rotation angles and discrete zooming levels, and the forward coordinate transformation can be selected to provide the discrete rotation angles and zooming levels according to a predetermined order. For example, the system can select a next zooming level after having selected all the discrete rotation angles for a previous zooming level. In one implementation, the different zooming levels are selected in a decreasing order, starting with the largest zoom level.

Applying the coordinate transformation can include resampling the image that is specified by pixels in an input array. After a general coordinate transformation, the pixels' transformed locations typically do not match pixel locations in an output pixel array. To specify output pixel values, the transformed image is resampled. For example, each output pixel can take the value of the closest transformed pixel. Alternatively, the output pixel's value can be determined using a bilinear or bicubic interpolation, which can avoid resampling artifacts. To avoid artifacts when the image size is reduced by more than a factor of two, the system can also use MIP-map filtering (multum in parvo, Latin for multitude in a small space). Bilinear, bicubic, and MIP-map filtering are often built into the hardware of graphics processing units that can perform the built-in filtering operations without incurring additional computational cost.

The system filters the transformed image using a detection filter that is defined based on a feature to be detected in the image (step 240). In one implementation, the detection filter is defined by training a neural network based on an object to be detected. The transformed image can be filtered by a GPU executing an application that specifies basic operations for the GPU, as discussed below with reference to FIG. 7.

The system applies a backward coordinate transformation to align the filtered image with one or more accumulation arrays (step 250), and uses the aligned image to update the accumulation arrays (step 260). If the forward transformation includes multiple elementary transformations, the system can define (and appropriately initialize) separate accumulation arrays for different elementary transformations. For example, a first accumulation array can be used to accumulate filtered images having different rotation angles at a particular zoom level, and a second accumulation array can accumulate the results that have been accumulated for different zoom levels in the first array.

The system determines whether further forward coordinate transformations should be applied to the received image (decision 270). If further transformations are required ("Yes" branch of decision 270), the system performs a new iteration by repeating the steps of selecting a new current forward transformation (step 220), transforming the image (step 230), filtering the transformed image (step 240), aligning the filtered image with the accumulation array (step 250) and updating the accumulation array (step 260). If no further transformations are required ("No" branch of decision 270), the system uses the accumulation array to identify the feature in the image (step 280).

In one implementation, the system uses the accumulation array to generate a detection map. The detection map specifies confidence values that correspond to respective locations in the received image. Each confidence value is based on accumulated values in one or more corresponding elements in the accumulation array, and characterizes whether the feature is represented in the received image at the corresponding location. The detection map can also specify coordinate transformation attributes that are associated with the confidence value at that location.

If the accumulation array is calculated using a GPU, the detection map can be defined as a pixel array that matches that of the received image. Thus, in the detection map, a pixel's location represents the same location in the received image, and instead of color components, the pixel's value specifies a respective confidence value that characterizes whether the feature is contained in the image at the pixel's location. In the detection map, the pixel's value can also specify the orientation and zoom level associated with the confidence value at that location. If each pixel value has four components, originally designated for three color values and one transparency value, one component can be used for the confidence value, and the remaining three components for the associated transformation parameters. If more than three transformation parameters are associated with a confidence value, the additional parameters can be stored in another pixel array that matches that of the received image.

Figure 3:
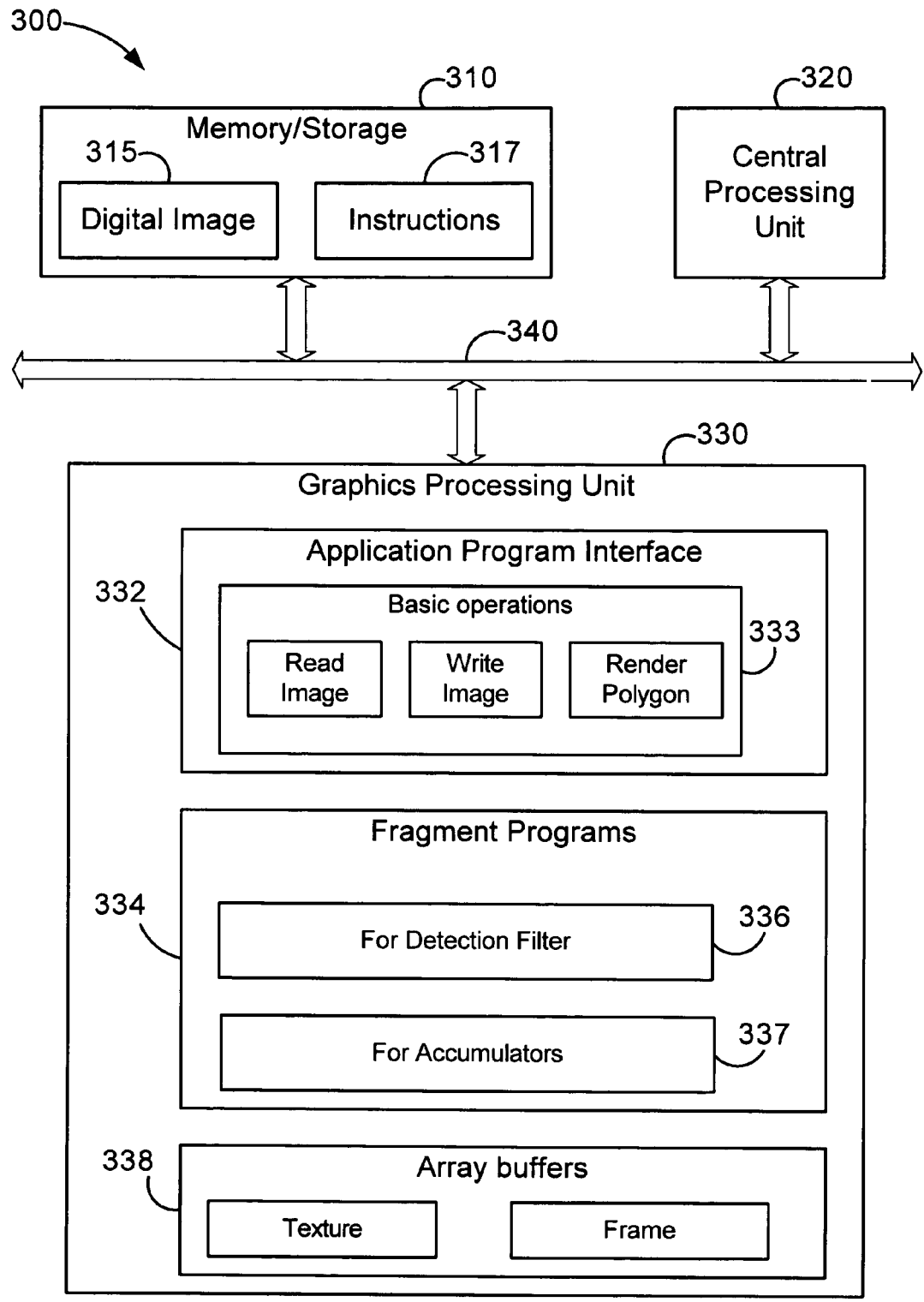
FIG. 3 is a schematic diagram illustrating a computer system to detect features in digital images.

FIG. 3 illustrates a computer system 300 to detect features in a digital image 315. The computer system 300 can implement the feature detector 100 (FIG. 1) and detect features in the image 315 by performing the method 200 (FIG. 2).

The computer system 300 includes a memory/storage unit 310, a central processing unit 320, a graphics processing unit 330, and communication lines 340. The memory/storage unit 310 stores the digital image 315 and instructions 317 for the CPU 320 or the GPU 330. The CPU 320 controls the computer system 300, including the GPU 330, and the GPU 330 is primarily dedicated to image processing. The CPU 320 and the GPU 330 communicate with each other or the memory/storage unit 310 through the communication lines 340 that can include data buses, network connections, wireless connections or any other means for communicating digital data. For example, the CPU 320 can send the digital image 315, some of the instructions 317 and other data or instruction to the GPU 330.

The instructions 317 include instructions for detecting one or more features in the image 315. In one implementation, the GPU 330 executes instructions to perform the feature detection and the CPU 320 executes other instructions. The CPU 320 can also execute one or more instructions for the feature detection. Alternatively, the GPU 330 is used only to receive or display the image, which is transmitted to the CPU that performs all operations of the feature detection.

The GPU 330 is a processor that is developed to execute instructions related to image processing. The instructions can be received from the CPU 320 or the memory/storage unit 310 through the communication lines 340. The GPU 330 can be programmed based on an application program interface ("API") 332, such as OpenGL developed by Silicon Graphics Incorporated of Mountain View, Calif., or Direct3D developed by Microsoft Corporation of Redmond, Wash. The API 332 specifies a set of basic operations 333 including image data reading and writing operations and polygon rendering operations.

The GPU 330 executes fragment programs 334 that can include the basic operations 333. The fragment programs 334 use array buffers 338 to store input image data (texture buffers) and output image data (frame buffers). The array buffers 338 can be implemented as pixel arrays. For each pixel in an output frame buffer, the fragment programs 334 are executed separately and independently. Thus for multiple pixels, the GPU 330 can execute multiple fragment programs 334 in parallel, which can substantially accelerate image processing. An exemplary fragment program is illustrated in FIG. 4.

Figure 5:
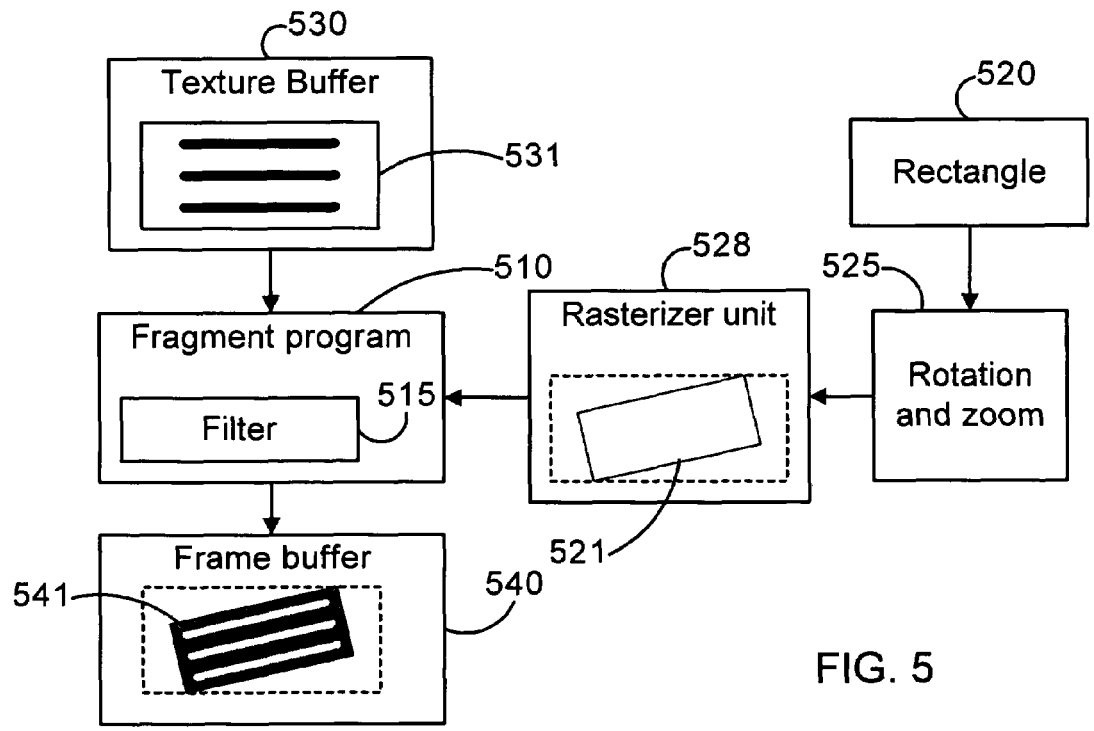
FIG. 5 is a schematic diagram illustrating image filtering by fragment programs.
Figure 6A:
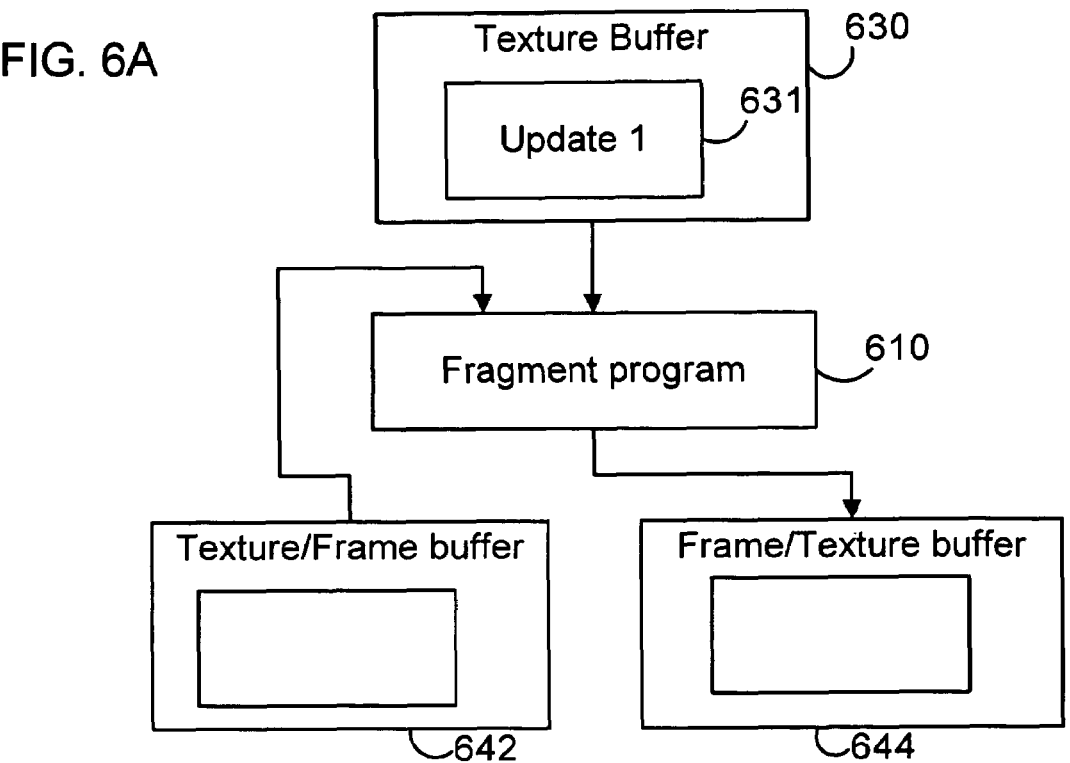
FIGS. 6A and 6B are schematic diagrams illustrating data accumulation by fragment programs.
Figure 6B:
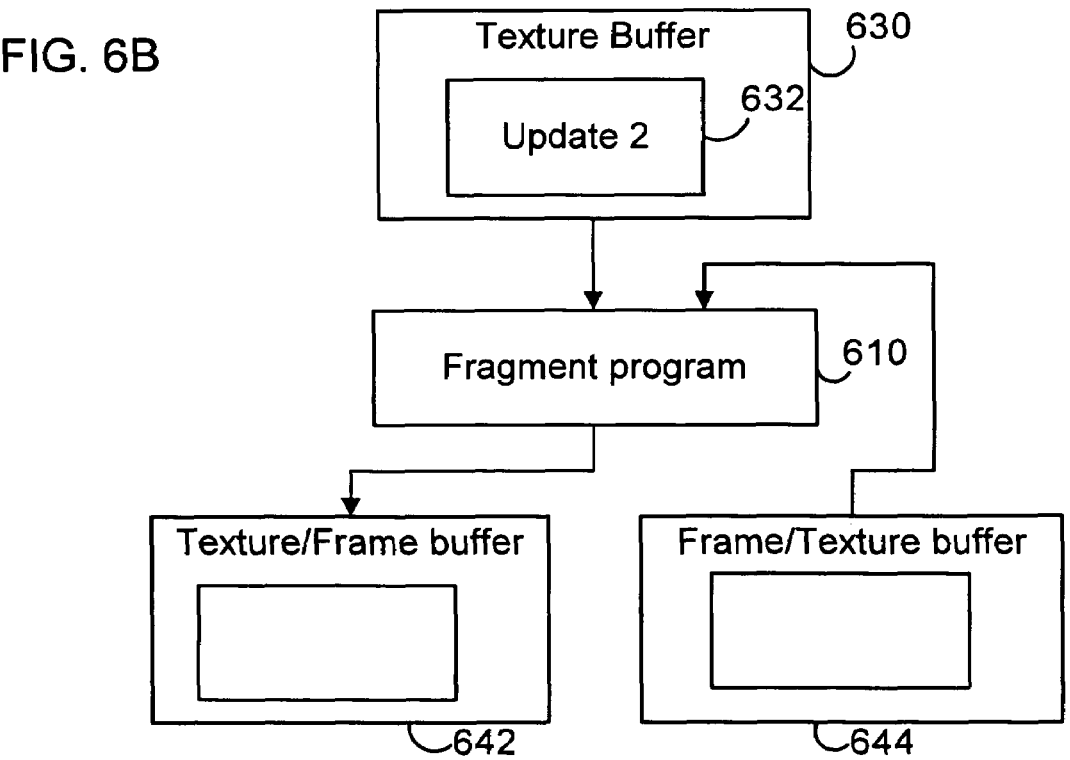
Figure 7:
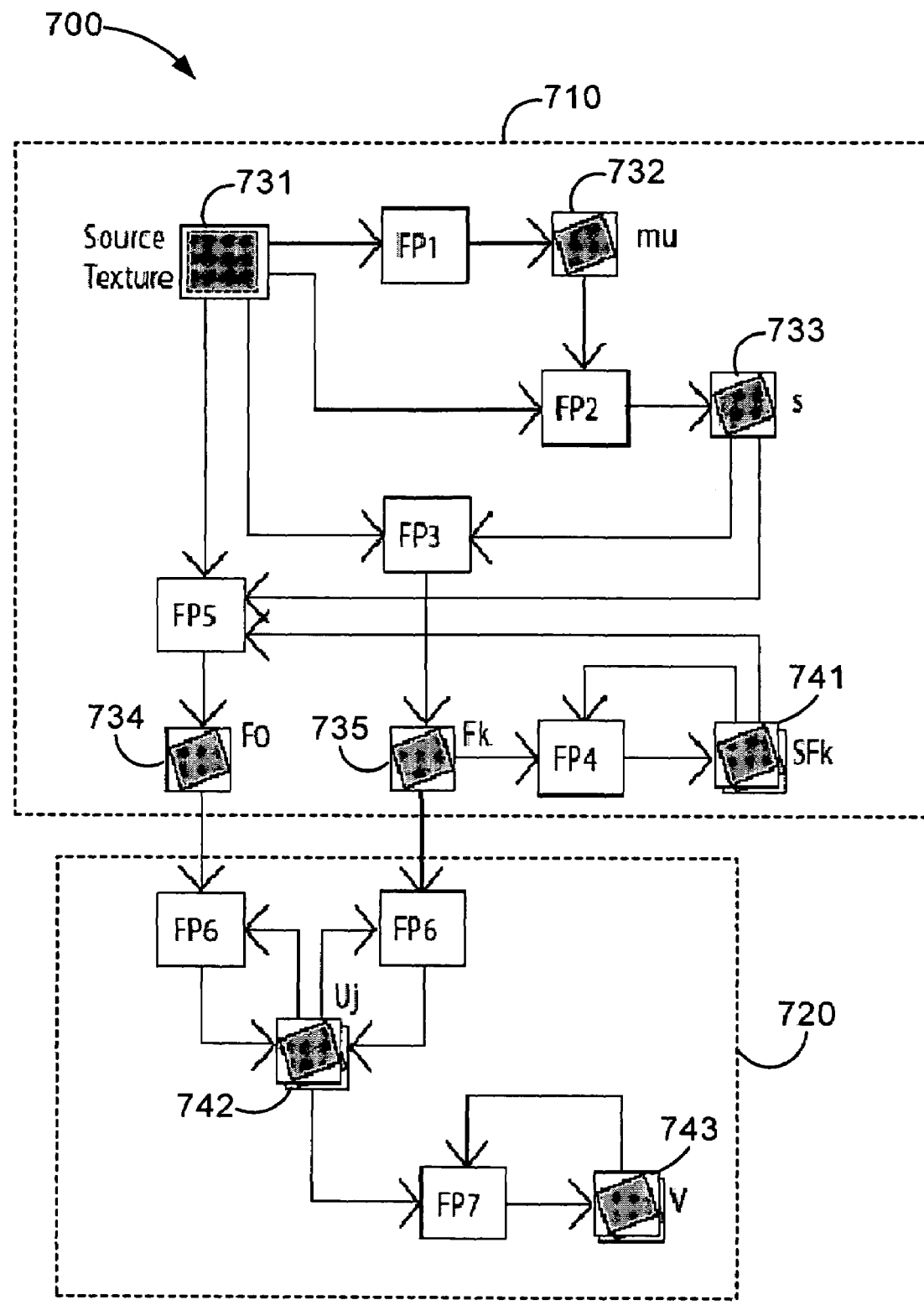
FIG. 7 is a schematic diagram illustrating an exemplary filter to detect objects in digital images.

During feature detection, the GPU 330 executes fragment programs for one or more filters 336 and accumulators 337. For the implementation illustrated in FIG. 1, the fragment programs for filters 336 can implement the detection filter 120, and the fragment programs for accumulators 337 can implement the accumulator 140. The GPU 330 can also include hardware that is built to apply coordinate transformations to input image data received by the fragment programs 334. For example, the built-in hardware can apply the forward coordinate transformers 110 to the input of the fragment programs for filters 336, and the backward coordinate transformers 130 to the input of the fragment programs for accumulators 337. FIG. 5 illustrates an example of implementing an elementary filter with a fragment program and applying coordinate transformations on the input of the fragment program, FIGS. 6A and 6B illustrate an example implementation of using fragment programs for accumulation, and FIG. 7 illustrates an example implementation of using multiple fragment programs for implementing the detection filter 120.

Typically, the GPU 330 can be configured to a desired numerical representation. For a high precision detection filter or accumulator, the GPU 330 can be configured to use high precision pixel representations, such as eight or more bits per pixels. The pixel representation can also be set to support negative values.

Figure 4:
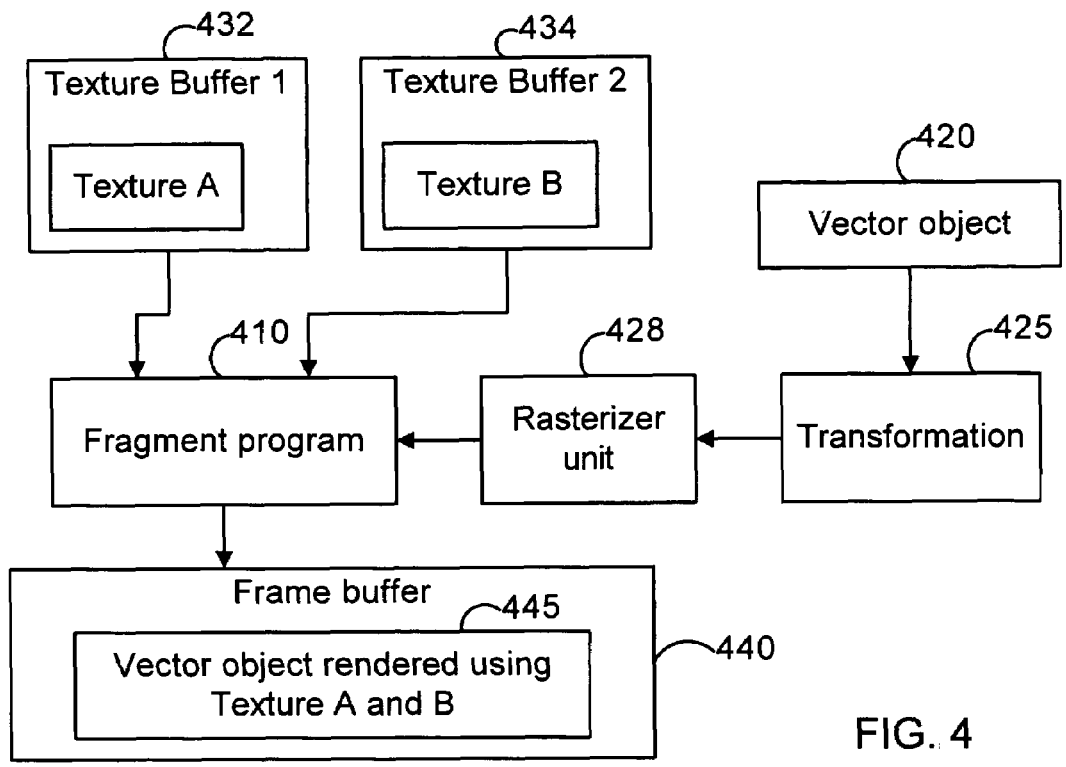
FIG. 4 is a schematic diagram illustrating an exemplary fragment program.

FIG. 4 illustrates an example fragment program 410 that can be executed by a GPU. The fragment program 410 renders a vector graphics object 420 into a frame buffer 440 according to a previously defined transformation 425. If the vector object 420 is a polygon or other vector object specified by vertices, the transformation 425 typically includes a coordinate transformation of the specified vertices. The transformed vertices are received in a rasterization unit 428 that outputs raster pixels corresponding to the transformed vector object. For each raster pixel, the fragment program 410 is executed independently (and typically, in parallel for multiple pixels).

The fragment program 410 can receive one or more textures for rendering the vector object 420. In the example shown in FIG. 4, the fragment program 410 receives a "texture A" stored in a first texture buffer 432 and a "texture B" stored in a second texture buffer 434. The fragment program 410 uses the textures A and B to generate a rendered vector object 445 into the frame buffer 440.

For each raster pixel received from the rasterization unit 428, the fragment program 410 calculates a respective output pixel value for the rendered object 445 based on image data within a corresponding source window in the texture buffers 432 and 434. The calculation of the output pixel value is programmable, and can be specified by computer languages such as low-level assembly languages or high level languages, for example, high-level shader language ("HLSL") developed by Microsoft, OpenGL shader language ("GLSL") developed by 3Dlabs of Madison, Ala., or C for graphics ("Cg") language developed by NVIDIA of Santa Clara, Calif.

For a raster pixel, the corresponding source window can be defined as a single particular location in the texture buffers 432 and 434, and the fragment program 410 can calculate the corresponding output pixel value by combining the image data at the particular location in the texture buffers 432 and 434. With a shader language, the fragment program 410 is programmable to implement a large variety of mathematical expressions using the image data in one or more of the texture buffers 432 and 434.

The source window can also be defined as a finite region within an input pixel array. The source window can be defined in the texture buffer 432 or 434 or in an internal buffer onto which the vector object 420 is rasterized according to the transformation 425. The source window can be defined, and the fragment program 410 can be programmed to process the image data in the respective source window as required by a filter or an accumulator. Based on these programmable features, the fragment program 410 can be used to implement one or more steps of feature detection.

FIG. 5 illustrates an exemplary fragment program 510 that can be executed by a system including a GPU. The fragment program 510 applies a filter 515 to an image 531 stored in a texture buffer 530. The filter 515 is applied after the GPU transformed the image 531 according to a coordinate transformation 525 that specifies a rotation and a zooming. The transformed and filtered image 541 is stored in a frame buffer 540.

The fragment program 510 renders an input rectangle 520 that is defined to represent the outline of the image 531. The input rectangle 520 is rasterized by a rasterization unit 528 according to the coordinate transformation 525 that defines a transformed rectangle 521 from the input rectangle 520. For each raster pixel of the transformed rectangle 521, the fragment program 510 calculates an output pixel value using a texture that is defined by the image 531 in the texture buffer 530. In addition to the transformation 525, a texture transformation can also be specified relative to the transformed rectangle 521. If no texture transformation is defined (for example by specifying an identity texture transformation), the image 531, which defines the texture in the texture buffer 530, will be fit into the transformed rectangle 521. Thus the fragment program 510 transforms the image 531 according to the transformation 525.

The fragment program 510 applies the filter 515 to the transformed image. The fragment program 510 is invoked separately (and typically in parallel) for each raster pixel received from the rasterizer unit 528, and determines a respective output pixel value based on image data in a corresponding source window within the transformed image. Thus, after the image 531 has been rotated and zoomed as defined by the coordinate transformation 525, the rotated and zoomed image is filtered as defined by the filter 515.

Table 1 illustrates an example pseudocode for a fragment program ("FP") that renders a rectangle (defined by vertices (0,0), (w,0), (0,h) and (w,h)) using multiple (N) input textures and a coordinate transformation ("T").

TABLE 1

Load and Activate Fragment Program (FP)
For k = 1 ... N
  Bind Texture k to FP Texture Unit k
Specify Vertex Coordinate Transformation (T)
For k = 1 ... N
  Specify Texture k Coordinate Transformation T_k
Begin Quadrangle
  Specify Vertex (0, 0)
  For k = 1 ... N
    Specify Texture k Coordinate (0, 0)
  Specify Vertex (w, 0)
  For k = 1 ... N
    Specify Texture k Coordinate (1, 0)
  Specify Vertex (0, h)
  For k = 1 ... N
    Specify Texture k Coordinate (0, 1)
  Specify Vertex (w, h)
  For k = 1 ... N
    Specify Texture k Coordinate (1, 1)
End Quadrangle In the example pseudocode, a coordinate transformation T is applied to the vertices of the rectangle specified in a "Quadrangle" unit of the pseudocode. The GPU applies the coordinate transformation T prior to executing the fragment program FP. The texture coordinate transformations T_k, which are identity transformations in the example, are also applied by the GPU prior to executing the fragment program FP. Also prior to executing the FP, the rectangle is rasterized, where the rasterization includes computing interpolated vertex and texture coordinates for each output frame buffer pixel that is covered by the rectangle.

When the fragment program FP is invoked for an output pixel, the fragment program FP receives the interpolated vertex and texture coordinates, and uses the received coordinates to identify image data that is specified in the texture, and associated with the output pixel. To identify the associated image data, the received texture coordinates can be processed using programmable arithmetic operations. With the arithmetic operations, the fragment program FP can identify a source window that has a geometrical shape surrounding a particular texture coordinate. Furthermore, the fragment program FP can directly access a particular pixel in a texture buffer. Such direct access can be used to access filter coefficients or other constants that are stored in texture buffers for the fragment program FP. Thus the fragment program FP can identify input values of a mathematical expression and arithmetically combine the input values to determine the value of the output pixel in the frame buffer.

FIGS. 6A and 6B illustrate an example fragment program 610 for accumulating data. The fragment program 610 accumulates data in an accumulation array that is implemented by two array buffers 642 and 644. During data accumulation, each of the array buffers 642 and 644 alternates between being a texture (that is, input) buffer and a frame (that is, output) buffer such that, for each accumulation step, data is read from one and written into the other of the buffers 642 and 644.

FIG. 6A illustrates updating the accumulation array implemented by the buffers 642 and 644 using a first update data 631 stored in a texture buffer 630. The buffer 642 stores current accumulated values of the accumulation array, and is treated as a texture (that is, input) buffer. The fragment program 610 receives the first update data 631 and the current accumulated values from the texture buffers 630 and 642, respectively, calculates updated accumulated values, and stores the updated values in the frame buffer 644.

FIG. 6B illustrates a subsequent update of the accumulation array implemented by the buffers 642 and 644. A second update data 632 is stored in the texture buffer 630. Because the most current accumulated values are specified by the buffer 644, it is now treated as a texture buffer. The fragment program 610 receives the second update data 632 and the most current accumulated values from the texture buffers 630 and 644, respectively, calculates new accumulated values, and stores the new accumulated values in the frame buffer 642. Thus the updated accumulated values are stored again in the buffer 642, so a subsequent update can be performed as illustrated in FIG. 6A. By implementing the accumulation array with two buffers, data is not simultaneously written into and read from the same buffer.

Simultaneous read and write operations can be avoided by other techniques as well. For example instead of alternating the roles of texture and frame buffers, one of the two buffers can be assigned as the texture buffer and the other as the frame buffer, and after each update, the content of the frame buffer can be copied into the texture buffer. The accumulation array can also be implemented using more than two buffers.

FIG. 7 illustrates an example implementation of a detection filter 700. The detection filter 700 can be used in the feature detector 100 (FIG. 1), for example, to identify objects in a digital image. The detection filter 700 is implemented using texture and frame buffers and fragment programs executed in a graphics processing unit.

The detection filter 700 includes a property calculator 710 and a classifier 720. The property calculator 710 calculates properties of a received image and the classifier 720 generates a filtered image based on the calculated properties. In the illustrated example, the property calculator 710 receives the image in a texture buffer 731 and sets parameters for a particular forward coordinate transformation, for example, a rotation or zoom transformation, that will be applied to the received image. The property calculator 710 is implemented by fragment programs (FP1-FP5), and the particular coordinate transformation is applied to the input of those fragment programs (FP1, FP2, FP3 and FP5) whose direct input is the received image in the texture buffer 731. In alternative implementations, the received image can be an image that has already been transformed according to the particular coordinate transformation, thus no further forward coordinate transformation needs to be applied by the property calculator 710.

For each pixel of the transformed image, the property calculator 710 calculates values for one or more properties of the received image in a source window associated with that pixel. The property calculator can calculate values for Fourier or wavelet components, or other general representation components of image data within the source window. The calculated properties can also include object specific properties that are designed based on a particular object to be detected. Such object specific properties can be determined heuristically, based on a neural network training or principal component analysis.

In one implementation, the object specific properties are determined for the property calculator 710 based on a set of positive training examples that represent the object to be detected in a source window. (Training sets can also include negative examples that represent objects that are different from the object to be detected.) First, the mean and covariance matrix is calculated for the positive training examples, and the eigenvectors of the covariance matrix are determined. Next, a number (q) of object specific properties are defined for the property calculator based on the q largest eigenvectors ($E_k$, $k=1, \ldots, q$) of the covariance matrix.

From the positive training examples, the following quantities are determined for a source window that includes 'n' pixels:

M—mean of the positive training examples, where $M=[M\_1, M\_2, \ldots, M\_n]$ is an n-component vector specifying a respective mean value for each pixel in the source window;

$M^2 = <M, M> = \Sigma_i^n M\_i\, M\_i$—square mean (the notation $<A,B> = \Sigma_i^n A\_i\, B\_i$ is referred to as a dot product of the n-component vectors A and B);

$E_k$—k-th ($k=1, \ldots, q$) eigenvector of the covariance matrix of the positive training examples, where each $E_k=[E_{k\_}1, E_{k\_}2, \ldots, E_{k\_}n]$ is an n-component vector; and $p_k = <M, E_k> = \Sigma_i^n M\_i\, E_{k\_}i$—k-th moment of the mean.

The quantities M, $M^2$, $E_k$, and $p_k$, can be determined offline as part of the training, and are kept constant during the feature detection when they are used to characterize image data in different source windows $W(x)=[W(x)\_1, W(x)\_2, \ldots, W(x)\_n]$, each of which is associated with a particular location x, and specifies the image data value W_i for the i-th ($i=1, \ldots, n$) pixel in the source window W(x).

The property calculator 710 calculates the following characteristics of image data in the source window W(x):

mu(x)=(W(x)_1+W(x)_2+ . . . +.W(x)_n)/n, which is an average of the image data within the source window W(x);

s(x)=1/(max(eps, (<W(x), W(x)>/n−mu(x)$^2$)$^{0.5}$)−1), which is a scaling factor and 'eps' is a constant (such as eps=0.01);

$F_k$(x)=s(x)<$E_k$, W(x)>−$p_k$, (k=1, . . . , q), which is a projection of the image data in the source window W(x) to the k-th eigenvector;

SF(x)=$\Sigma_k$ $F_k$(x)$^2$, which is a square of all the projections; and $F_0$(x)=(n+M$^2$−2 s(x)<W(x), M>−SF(x))$^{0.5}$, which is a distance between the image data in the source window and a subspace defined by the eigenvectors $E_k$.

To increase efficiency of the calculations, the additive constants and the square root in the expressions for the projection $F_k$(x) and the distance $F_0$(x) can be dropped if the training process is appropriately modified.

The property calculator 710 calculates values for the distance $F_0$(x) and the projections $F_k$(x) (k=1, . . . , q) based on image data in the corresponding source window W(x) by using the fragment programs FP1, FP2, FP3, FP4 and FP5. The results of the calculations are stored in buffers 732-735 and in an accumulation array 741 that can be implemented using (and is illustrated with) two buffers as discussed above with reference to FIGS. 6A and 6B. Each of the fragment programs is separately applied for each position x in the image substantially in the same (and in a highly parallelized) way. Thus for the clarity of the notation, reference for the location x is dropped in the following.

The property calculator 710 determines values for the distance $F_0$ and projections $F_k$ using the following steps:

a) The average image data mu is calculated using the fragment program FP1 that sums the pixel values within the corresponding source window W. The calculated average is stored in the buffer 732, which will be used as a texture buffer in subsequent steps.

b) The scaling factor s is calculated using the fragment program FP2 that sums the squares of the pixel values in the source window W, normalizes the sum by n which is the number of pixels in the source window, and subtracts the square of the average image data mu. The calculated scaling factor s is stored in the buffer 733, which will be used as a texture buffer in subsequent steps.

c) For each k=1 . . . q, a value for the projection $F_k$ is calculated using the fragment program FP3 that calculates the dot product of the source window W and the eigenvector $E_k$, scales the dot product by the scaling factor s, and subtract the k-th moment $p_k$. The scaling factor s is received from the texture buffer 733, and the eigenvector $E_k$ can be represented as a constant of the fragment program FP3 or stored in another texture buffer (not shown). The fragment program FP3 stores the calculated value of the projection $F_k$ in the buffer 735. The buffer 735 can include a separate pixel array to store each of the projections $F_k$. Alternatively, the buffer 735 can include a single pixel array, and each projection $F_k$ is processed by subsequent steps before the fragment program FP3 calculates the next projection.

d) The square SF of all the projections is calculated using the fragment program FP4 that receives a value of a current projection $F_k$ from the texture buffer 735, and sums the squares of all the projections $F_k$ in the accumulation array 741.

e) After calculating all the projections $F_k$, a value for the distance $F_0$ is calculated using the fragment program FP5 that receives the square SF of all the projections from the accumulation array 741 and the scaling factor s from the texture buffer 733. FP5 also uses the mean M and the square mean M$^2$ that are constants of the fragment program FP5. The calculated distance $F_0$ is stored in the buffer 734.

The classifier 720 determines a filtered value for each location of the transformed image based on the values calculated for the distance $F_0$ and projections $F_k$. The classifier 720 is defined by a neural network whose input is defined by the distance $F_0$ and the projections $F_k$ (k=1, . . . , q). The input is first processed by a hidden layer including L hidden units H_j (j=1, . . . , L). Each hidden unit H_j calculates a weighted sum U_j of the distance $F_0$ and the projections $F_k$ using constant coefficients A_j0 and A_jk that are determined through the neural network training process (for example, a backpropagation algorithm). Thus the weighted sum U_j is calculated as $$U\_j = A\_j0 F_0 + \Sigma_k A\_jk F_k, (j=1, \ldots, L).$$

For each hidden unit H_j, an output V_j is defined using a sigmoid-shaped function g and a bias B_j as $$V\_j = g(U\_j + B\_j).$$

In one implementation, g(x) is defined as exp(c x)/(1+exp(c x)), with a real valued c, such as c=20. The outputs V_j are summed again according to some weights to define an output V of the classifier 720. A final output of the detection filter 700 is specified based on the output V of the classifier 720. For example, the output V or a predetermined function of it can be defined as a confidence value that characterizes whether the object is illustrated in the image or not.

The classifier 720 uses the fragment programs FP6 and FP7 to implement the neural network. The fragment program receives the distance $F_0$ and projections $F_k$ from the property calculator 710, and calculates the weighted sum U_j for each hidden unit H_j in an accumulation array 742. The fragment program FP7 accumulates the weighted sums U_j in another accumulation array 743 to define the output V of the classifier 720. Both of the accumulation arrays 742 and 743 can be implemented using (and are illustrated with) two buffers as discussed above with reference to FIGS. 6A and 6B.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

In general, processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

In particular, the present invention can be implemented using one or more graphics processing units. Developed primarily for 3-D graphics applications, a graphics processing unit is a processor that creates lighting effects and transforms objects every time a 3D scene is redrawn. These are mathematically-intensive tasks, which otherwise, would put quite a burden on the CPU. Lifting this burden from the CPU frees up cycles that can be used for other jobs. Commercially available GPUs have been developed, for example, by NVIDIA Inc. whose GeForce 256 GPU is capable of performing billions of calculations per second, can process about 10 million polygons per second, and has over 22 million transistors. (For comparison, a typical CPU, such as Pentium® III developed by Intel Corporation of Santa Clara, Calif., includes about 9 million transistors.) Another of NVIDIA's GPU, called Quadro, is designed for computer aided design ("CAD") applications, and can process over 200 billion operations and about 17 million triangles per second. The GeForce GPU is compatible with the following graphics APIs: OpenGL and Microsoft's DirectX, Intel's Accelerated Graphics Port (AGP) technology, and 3DNow! developed by AMD of Sunnyvale, Calif.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention has been described in terms of particular embodiments. Other embodiments are within the scope of the following claims. For example, the steps of the invention can be performed in a different order and still achieve desirable results.

What is claimed is:

1. A computer program product, tangibly stored on a computer-readable medium, for processing electronic images, the computer program product comprising instructions operable to cause data processing apparatus to perform operations comprising:

(a) receiving an electronic image including a plurality of input pixels;

(b) generating a transformed image that corresponds to a first coordinate transformation of the received image;

(c) filtering the transformed image to generate a filtered image;

(d) applying a second coordinate transformation to the filtered image to align the filtered image with an accumulation array that includes a plurality of accumulation elements, the aligned image specifying a respective value for each accumulation element;

(e) updating each accumulation element based on the respective value in the aligned image; and (f) iterating the operations (b), (c), (d) and (e) for one or more further first coordinate transformations.

2. The computer program product of claim 1, wherein filtering the transformed image includes:

determining a filtered value based on image data within a source window in the transformed image; and assigning the filtered value to a corresponding location in the filtered image.

3. The computer program product of claim 2, wherein:

determining the filtered value includes calculating an output of a neural network whose input is defined based on the image data within the source window.

4. The computer program product of claim 2, wherein:

determining the filtered value includes determining a confidence value that is a figure of merit on whether a particular object is illustrated in the source window.

5. The computer program product of claim 4, further comprising instructions to perform operations comprising:

using the accumulation array to identify at least one location in the received image as a location where the particular object is illustrated in the image.

6. The computer program product of claim 1, wherein:

updating each accumulation element based on the respective value in the aligned image includes assigning the respective value in the aligned image to the accumulation element if the respective value in the aligned image is larger than an accumulated value specified by the accumulation element before the update.

7. The computer program product of claim 6, wherein the first coordinate transformation is defined by one or more transformation parameters, and wherein:

updating each accumulation element includes associating the transformation parameters with the accumulation element if the respective value in the aligned image is larger than the accumulated value before the update.

8. The computer program product of claim 7, wherein:

associating the transformation parameters with the accumulation element includes storing one or more of the transformation parameters as a red, green, blue or transparency component of a pixel corresponding to the accumulation element in a pixel array.

9. The computer program product of claim 1, wherein the accumulation array includes a respective accumulation element for each input pixel.

10. The computer program product of claim 1, wherein:

generating a transformed image includes generating a transformed image corresponding to a rotation of the received image.

11. The computer program product of claim 1, wherein:

generating a transformed image includes generating a transformed image corresponding to a zooming in or out transformation of the received image.

12. The computer program product of claim 1, wherein the first coordinate transformation is specified by two or more elementary transformations, and the second coordinate transformation is an inverse of one or more of the elementary transformations.

13. The computer program product of claim 12, wherein the second coordinate transformation is an inverse of the first coordinate transformation.

14. The computer program product of claim 1, wherein:
generating the transformed image that corresponds to the first coordinate transformation of the received image includes applying the first coordinate transformation to the received image.

15. The computer program product of claim 1, wherein:
the instructions to filter the transformed image include instructions operable to cause a graphics processing unit to perform one or more basic operations of the graphics processing unit, the basic operations including basic polygon rendering operations.

16. The computer program product of claim 15, wherein each basic polygon rendering operation includes:
receiving a vector graphics object; and
rasterizing the vector graphics object onto a pixel array.

17. The computer program product of claim 1, wherein updating each accumulation element includes:
assigning a first buffer and a second buffer to the accumulation element;
using the first buffer to specify an accumulated value before the update; and
using the second buffer to store an updated accumulated value.

18. The computer program product of claim 17, further comprising instructions to perform operations comprising, for each accumulation element:
in a subsequent iteration, using the second buffer to specify the accumulated value before the update and using the first buffer to store the updated accumulated value.

19. An apparatus for processing electronic images, the apparatus comprising:
means for receiving an electronic image including a plurality of input pixels;
means for generating a transformed image that corresponds to a first coordinate transformation of the received image;
means for filtering the transformed image to generate a filtered image;
means for applying a second coordinate transformation to the filtered image to align the filtered image with an accumulation array that includes a plurality of accumulation elements, the aligned image specifying a respective value for each accumulation element;
means for updating each accumulation element based on the respective value in the aligned image; and
means for iterating, for one or more further first coordinate transformations, the operations of generating a respective transformed image, filtering the transformed image, applying the second coordinate transformation and updating the accumulation elements.

20. A system for detecting features in an electronic image including a plurality of input pixels, the system comprising:
a central processing unit; and
a graphics processing unit controlled by the central processing unit and configured to receive the image and detect a feature in the received image, the graphics processing unit implementing:
a first coordinate transformer to generate a transformed image that corresponds to a first coordinate transformation of the received image;
a detection filter to filter the transformed image to generate a filtered image;
a second coordinate transformer to apply a second coordinate transformation to the filtered image, the second coordinate transformation aligning the filtered image with an accumulation array that includes a plurality of accumulation elements, the aligned image specifying a respective value for each accumulation element; and
an accumulator to update each accumulation element based on the respective value in the aligned image.

21. The system of claim 20, wherein the central processing unit is configured to instruct the graphics processing unit to iterate for one or more further first coordinate transformations operations comprising:
generating a respective transformed image using the first coordinate transformer;
filtering the transformed image using the detection filter;
aligning the filtered image with the accumulation array using the second coordinate transformer; and
based on the aligned image, updating the accumulation array using the accumulator.

22. The system of claim 20, wherein the first and second coordinate transformers include programmable hardware of the graphics processing unit to perform the first and second coordinate transformations, respectively.

23. The system of claim 20, wherein the central processing unit is configured to preprocess the image.

24. A computer-implemented method for processing electronic images, the method comprising:
(a) receiving an electronic image including a plurality of input pixels;
(b) generating a transformed image that corresponds to a first coordinate transformation of the received image;
(c) filtering the transformed image to generate a filtered image;
(d) applying a second coordinate transformation to the filtered image to align the filtered image with an accumulation array that includes a plurality of accumulation elements, the aligned image specifying a respective value for each accumulation element;
(e) updating each accumulation element based on the respective value in the aligned image; and
(f) iterating the operations (b), (c), (d) and (e) for one or more further first coordinate transformations.

25. The method of claim 24, wherein filtering the transformed image includes:
determining a filtered value based on image data within a source window in the transformed image; and
assigning the filtered value to a corresponding location in the filtered image.

26. The method of claim 25, wherein:
determining the filtered value includes determining a confidence value that is a figure of merit on whether a particular object is illustrated in the source window.

27. The method of claim 26, further comprising:
using the accumulation array to identify at least one location in the received image as a location where the particular object is illustrated in the image.

28. The method of claim 25, wherein:
determining the filtered value includes calculating an output of a neural network whose input is defined based on the image data within the source window.

29. The method of claim 24, wherein:
updating each accumulation element based on the respective value in the aligned image includes assigning the respective value in the aligned image to the accumulation element if the respective value in the aligned image is larger than an accumulated value specified by the accumulation element before the update.

30. The method of claim 29, wherein the first coordinate transformation is defined by one or more transformation parameters, and wherein:
updating each accumulation element includes associating the transformation parameters with the accumulation element if the respective value in the aligned image is larger than the accumulated value before the update.

31. The method of claim 30, wherein:
associating the transformation parameters with the accumulation element includes storing one or more of the transformation parameters as a red, green, blue or transparency component of a pixel corresponding to the accumulation element in a pixel array.

32. The method of claim 24, wherein:
filtering the transformed image includes instructing a graphics processing unit to perform one or more basic operations of the graphics processing unit, the basic operations including basic polygon rendering operations.

33. The method of claim 32, wherein each basic polygon rendering operation includes:
receiving a vector graphics object; and
rasterizing the vector graphics object onto a pixel array.

34. The method of claim 24, wherein updating each accumulation element includes:
assigning a first buffer and a second buffer to the accumulation element;
using the first buffer to specify an accumulated value before the update; and
using the second buffer to store an updated accumulated value.

35. The method of claim 34, further comprising for each accumulation element:
in a subsequent iteration, using the second buffer to specify the accumulated value before the update and using the first buffer to store the updated accumulated value.

36. The method of claim 24, wherein the accumulation array includes a respective accumulation element for each input pixel.

37. The method of claim 24, wherein:
generating a transformed image includes generating a transformed image corresponding to a rotation of the received image.

38. The method of claim 24, wherein:
generating a transformed image includes generating a transformed image corresponding to a zooming in or out transformation of the received image.

39. The method of claim 24, wherein the first coordinate transformation is specified by two or more elementary transformations, and the second coordinate transformation is an inverse of one or more of the elementary transformations.

40. The method of claim 39, wherein the second coordinate transformation is an inverse of the first coordinate transformation.

41. The method of claim 24, wherein:
generating the transformed image that corresponds to the first coordinate transformation of the received image includes applying the first coordinate transformation to the received image.

42. A system comprising:
a processor; and
a computer-readable medium comprising a computer program product encoding instructions to cause the processor to perform operations comprising:

(a) receiving an electronic image including a plurality of input pixels;
(b) generating a transformed image that corresponds to a first coordinate transformation of the received image;
(c) filtering the transformed image to generate a filtered image;
(d) applying a second coordinate transformation to the filtered image to align the filtered image with an accumulation array that includes a plurality of accumulation elements, the aligned image specifying a respective value for each accumulation element;
(e) updating each accumulation element based on the respective value in the aligned image; and
(f) iterating the operations (b), (c), (d) and (e) for one or more further first coordinate transformations.

43. The system of claim 42, wherein filtering the transformed image includes:
determining a filtered value based on image data within a source window in the transformed image; and
assigning the filtered value to a corresponding location in the filtered image.

44. The system of claim 43, wherein:
determining the filtered value includes calculating an output of a neural network whose input is defined based on the image data within the source window.

45. The system of claim 43, wherein:
determining the filtered value includes determining a confidence value that is a figure of merit on whether a particular object is illustrated in the source window.

46. The system of claim 45, wherein the operations further comprise:
using the accumulation array to identify at least one location in the received image as a location where the particular object is illustrated in the image.

47. The system of claim 42, wherein:
updating each accumulation element based on the respective value in the aligned image includes assigning the respective value in the aligned image to the accumulation element if the respective value in the aligned image is larger than an accumulated value specified by the accumulation element before the update.

48. The system of claim 47, wherein the first coordinate transformation is defined by one or more transformation parameters, and wherein:
updating each accumulation element includes associating the transformation parameters with the accumulation element if the respective value in the aligned image is larger than the accumulated value before the update.

49. The system of claim 48, wherein:
associating the transformation parameters with the accumulation element includes storing one or more of the transformation parameters as a red, green, blue or transparency component of a pixel corresponding to the accumulation element in a pixel array.

50. The system of claim 42, wherein the accumulation array includes a respective accumulation element for each input pixel.

51. The system of claim 42, wherein:
generating a transformed image includes generating a transformed image corresponding to a rotation of the received image.

52. The system of claim 42, wherein:
generating a transformed image includes generating a transformed image corresponding to a zooming in or out transformation of the received image.

53. The system of claim 42, wherein the first coordinate transformation is specified by two or more elementary transformations, and the second coordinate transformation is an inverse of one or more of the elementary transformations.

54. The system of claim 53, wherein the second coordinate transformation is an inverse of the first coordinate transformation.

55. The system of claim 42, wherein:
generating the transformed image that corresponds to the first coordinate transformation of the received image includes applying the first coordinate transformation to the received image.

56. The system of claim 42, wherein:
the instructions to filter the transformed image include instructions operable to cause a graphics processing unit to perform one or more basic operations of the graphics processing unit, the basic operations including basic polygon rendering operations.

57. The system of claim 56, wherein each basic polygon rendering operation includes:
receiving a vector graphics object; and
rasterizing the vector graphics object onto a pixel array.

58. The system of claim 42, wherein updating each accumulation element includes:
assigning a first buffer and a second buffer to the accumulation element;
using the first buffer to specify an accumulated value before the update; and
using the second buffer to store an updated accumulated value.

59. The system of claim 58, wherein the operations further comprise, for each accumulation element:
in a subsequent iteration, using the second buffer to specify the accumulated value before the update and using the first buffer to store the updated accumulated value.

* * * * *

UNITED STATES PATENT AND TRADEMARK OFFICE
CERTIFICATE OF CORRECTION

PATENT NO.       : 7,643,702 B1                                        Page 1 of 1
APPLICATION NO.  : 10/898489
DATED            : January 5, 2010
INVENTOR(S)      : Jonathan Brandt It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1477 days.

Signed and Sealed this

Sixteenth Day of November, 2010

David J. Kappos
*Director of the United States Patent and Trademark Office*